US010561948B2

(12) United States Patent
Tatsuke

(10) Patent No.: US 10,561,948 B2
(45) Date of Patent: Feb. 18, 2020

(54) PROGRAM AND SYSTEM

(71) Applicant: KABUSHIKI KAISHA SQUARE ENIX, Tokyo (JP)

(72) Inventor: Shinichi Tatsuke, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 356 days.

(21) Appl. No.: 15/491,245

(22) Filed: Apr. 19, 2017

(65) Prior Publication Data

US 2017/0304734 A1 Oct. 26, 2017

(30) Foreign Application Priority Data

Apr. 22, 2016 (JP) .................................. 2016-086066

(51) Int. Cl.
*A63F 13/58* (2014.01)
*A63F 13/822* (2014.01)
(Continued)

(52) U.S. Cl.
CPC .......... *A63F 13/822* (2014.09); *A63F 13/537* (2014.09); *A63F 13/55* (2014.09);
(Continued)

(58) Field of Classification Search
CPC .......... A63F 13/55; A63F 13/58; A63F 13/69; A63F 13/822; A63F 2300/65; A63F 2300/609; A63F 2300/807
See application file for complete search history.

(56) References Cited

U.S. PATENT DOCUMENTS 4,858,930 A * 8/1989 Sato ........................ A63F 13/10
463/23
8,016,680 B1 * 9/2011 Hutter ..................... A63F 13/67
434/128
(Continued)

FOREIGN PATENT DOCUMENTS

JP 2011-147498 8/2011
JP 2011-255031 12/2011
(Continued)

OTHER PUBLICATIONS

"Experience Points" source: https://www.giantbomb.com/experience-points/3015-39/. Accessed Jan. 17, 2015 (Year: 2015).*
(Continued)

*Primary Examiner* — Steven J Hylinski
(74) *Attorney, Agent, or Firm* — Greenblum & Bernstein, P.L.C.

(57) ABSTRACT

A non-transitory computer-readable medium including a program product for causing a user terminal to realize functions to control progress of a video game is provided. The functions include: an experience value giving function configured to give an experience value to an object on the basis of a result of an event that occurs in accordance with progress of the video game; a managing function configured to manage a level of the object on the basis of the given experience value; and a privilege giving function configured to give a privilege to the object on the basis of an experience value that has been given and exceeds a value required to reach an upper limit of the level.

14 Claims, 10 Drawing Sheets

(51) Int. Cl.
*A63F 13/537* (2014.01)
*A63F 13/55* (2014.01)
*A63F 13/69* (2014.01)

(52) U.S. Cl.
CPC .............. *A63F 13/58* (2014.09); *A63F 13/69* (2014.09); *A63F 2300/609* (2013.01); *A63F 2300/65* (2013.01); *A63F 2300/807* (2013.01)

(56) References Cited

U.S. PATENT DOCUMENTS

| | | | | |
|---|---|---|---|---|
| 2002/0142848 | A1* | 10/2002 | Tsuchida | A63F 13/10 463/43 |
| 2003/0122858 | A1* | 7/2003 | Mauve | A63F 13/12 715/706 |
| 2004/0259617 | A1* | 12/2004 | MacHida | A63F 13/10 463/5 |
| 2006/0046803 | A1* | 3/2006 | Suzuki | A63F 13/10 463/8 |
| 2007/0207844 | A1* | 9/2007 | Pottinger | A63F 13/10 463/9 |
| 2011/0312407 | A1 | 12/2011 | Sakurai et al. | |

FOREIGN PATENT DOCUMENTS

| | | |
|---|---|---|
| JP | 2014-131758 | 7/2014 |
| JP | 2015-083187 | 4/2015 |
| JP | 5837246 | 12/2015 |
| JP | 2016-019829 | 2/2016 |

OTHER PUBLICATIONS

"Leveling Up" source: https://www.giantbomb.com/leveling-up/3015-475/. Accessed Jan. 21, 2015 (Year: 2015).*

Office Action from Japan Patent Office (JPO) in Japanese Patent Appl. No. 2016-086066, dated Dec. 5, 2017, together with a partial English language translation.

Office Action from Japan Patent Office (JPO) in Japanese Patent Appl. No. 2016-086066, dated Sep. 25, 2018, together with an English language translation.

Office Action from Japan Patent Office (JPO) in Japanese Patent Appl. No. 2016-086066, dated Apr. 4, 2017, together with a partial English language translation.

"PSO2 Syoshinsya no Tame no Koryaku Guide" [online], Nov. 14, 2012, <URL: http://pso2mania.blog.fc2.com/blog-entry-321.html>, together with a partial English language translation.

"Shikihime Project—Kakuryo no Mon" [online], Oct. 16, 2014, <URL:http://web.archive.org/web/20141016145532/http://www.kakuriyo-no-mon.com/guides/stp>.

"Meripo no Kisochishiki" [online], Jul. 11, 2007, <URL: http://web.archive.org/web/20070711225347/http://www.dynamisy.com/tulia/beginner.shtml>.

* cited by examiner

Fig. 13

OBJECT INFORMATION

| OBJECT ID | LEVEL (UPPER LIMIT) | ACCUMULATED EXPERIENCE VALUE | IMAGE | PARAMETER | ⋯ |
|---|---|---|---|---|---|
| 001 | 60(60) | 55555 | 001.jpeg | ⋯ | ⋯ |
| 002 | 35(60) | 25555 | 002.jpeg | ⋯ | ⋯ |
| ⋮ | ⋮ | ⋮ | ⋮ | ⋮ | ⋮ |

Fig. 14

LEVEL INFORMATION

| LEVEL | ACCUMULATED EXPERIENCE VALUE |
|---|---|
| 1 | 20 |
| 2 | 40 |
| ⋮ | ⋮ |
| 36 | 25558 |
| ⋮ | ⋮ |
| 59 | 51000 |
| 60 | 54000 |

Fig. 15

PRIVILEGE INFORMATION

| NUMBER OF TIMES TO GIVE (GIVING STEPS) | ACCUMULATED EXPERIENCE VALUE | PRIVILEGE |
|---|---|---|
| 1 | 60000 | ITEM A |
| 2 | 70000 | SKILL A |
| ⋮ | ⋮ | ⋮ |
| 9 | 150000 | ITEM B |
| 10 | 200000 | SKILL B |
| ⋮ | ⋮ | ⋮ |

PROGRAM AND SYSTEM

CROSS-REFERENCE TO RELATED APPLICATION

The present application relates to subject matter contained in Japanese Patent Application No. 2016-86066 field on Apr. 22, 2016, the disclosure of which is expressly incorporated herein by reference in its entirety.

BACKGROUND OF THE INVENTION

1. Field of the Invention

At least one of embodiments according to the present invention relates to a non-transitory computer-readable medium including a program for causing a user terminal to realize functions to control progress of a video game, a system therefor, and a non-transitory computer-readable medium including a program for causing a server to realize functions to control progress of a video game.

2. Description of the Related Art

Heretofore, there is a video game system in which an upper limit is set to a level of a character.

In such video game systems, for example, there is one in which an upper limit value of a level of a character is reset by evolving the character (see Japanese Patent Application Publication No. 2014-131758). Thus, by resetting the upper limit value of the level, a case where an experience value cannot be obtained has been avoided.

However, in such a video game system, the upper limit of the level is never reset so long as a condition for resetting the upper limit of the level is not satisfied (namely, the upper limit of the level is reset in a case where such a condition is satisfied). For that reason, in a case where the level reaches the upper limit thereof before the condition is satisfied, an experience value that the level (or a user thereof) can obtain normally has been wasted. Namely, by wasting the experience value that the level (or the user thereof) can obtain normally, there has been a fear that this causes a motivation of a user to continue the video game to reduce.

SUMMARY OF THE INVENTION

It is an object of at least one of embodiments according to the present invention to solve the problem described above, and to prevent a motivation of a user to continue a video game from reducing.

According to one non-limiting aspect of one embodiment of the present invention, there is provided a non-transitory computer-readable medium including a program product for causing a user terminal to realize functions to control progress of a video game.

The functions include an experience value giving function configured to give an experience value to an object on the basis of a result of an event that occurs in accordance with progress of the video game.

The functions also include a managing function configured to manage a level of the object on the basis of the given experience value.

The functions also include a privilege giving function configured to give a privilege to the object on the basis of an experience value that has been given and exceeds a value required to reach an upper limit of the level.

According to another non-limiting aspect of one embodiment of the present invention, there is provided a system for controlling progress of a video game. The system includes a communication network, a server, and a user terminal.

The system includes an experience value giving section configured to give an experience value to an object on the basis of a result of an event that occurs in accordance with progress of the video game.

The system also includes a managing section configured to manage a level of the object on the basis of the given experience value.

The system also includes a privilege giving section configured to give a privilege to the object on the basis of an experience value that has been given and exceeds a value required to reach an upper limit of the level.

According to still another non-limiting aspect of one embodiment of the present invention, there is provided a non-transitory computer-readable medium including a program product for causing a server to realize functions to control progress of a video game.

The functions include an experience value giving function configured to give an experience value to an object on the basis of a result of an event that occurs in accordance with progress of the video game.

The functions also include a managing function configured to manage a level of the object on the basis of the given experience value.

The functions also include a privilege giving function configured to give a privilege to the object on the basis of an experience value that has been given and exceeds a value required to reach an upper limit of the level.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 13 is an explanatory drawing for explaining an example of a storage state of object information corresponding to at least one of the embodiments according to the present invention.

FIG. 14 is an explanatory drawing for explaining an example of a storage state of level information corresponding to at least one of the embodiments according to the present invention.

FIG. 15 is an explanatory drawing for explaining an example of a storage state of privilege information corresponding to at least one of the embodiments according to the present invention.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like did not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like did not occur in the content of the processing.

First Embodiment

Figure 1:
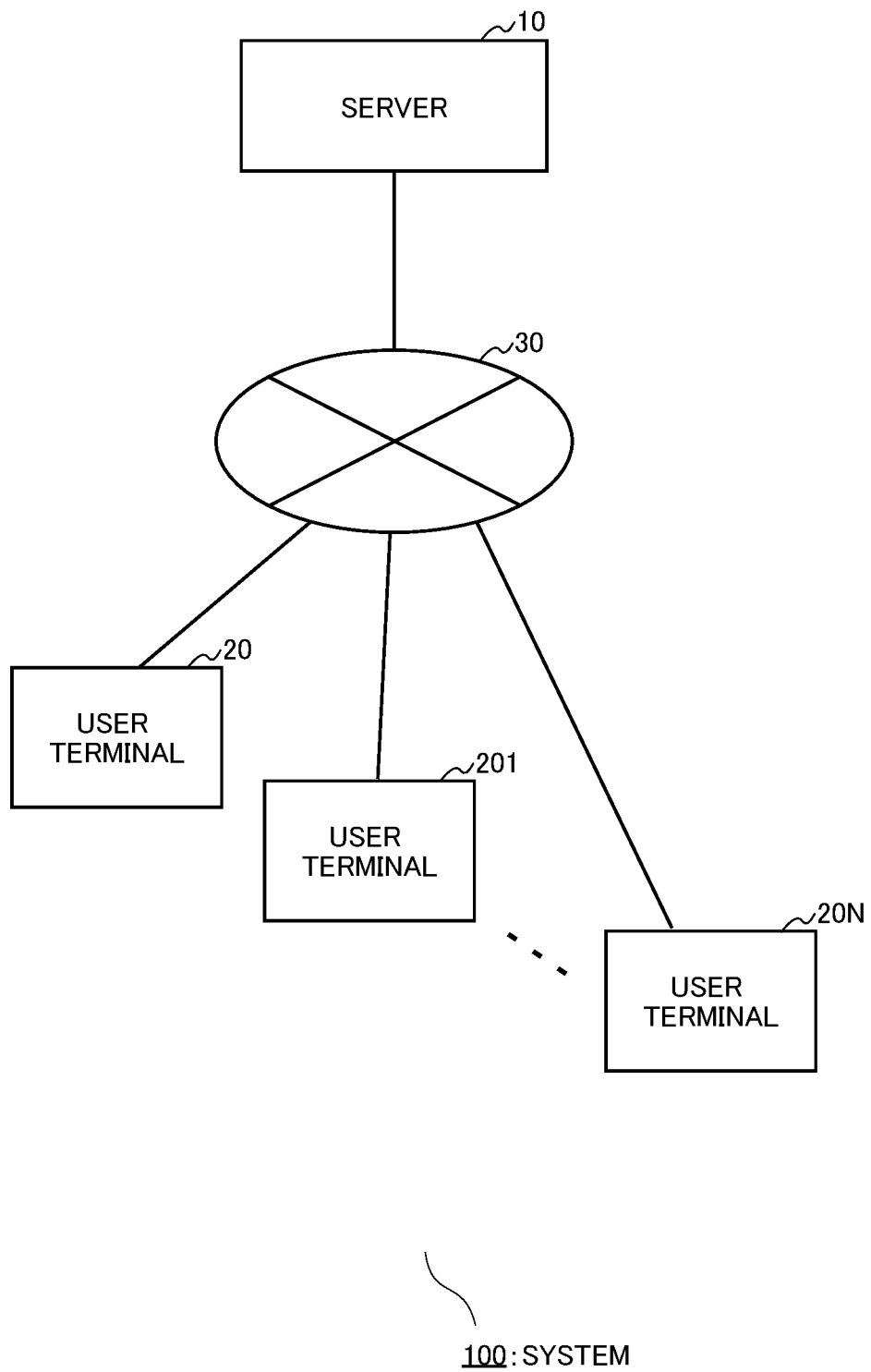
FIG. 1 is a block diagram showing an example of a configuration of a system corresponding to at least one of embodiments according to the present invention.

FIG. 1 is a block diagram showing an example of a configuration of a system 100 according to one embodiment of the present invention. As shown in FIG. 1, the system 100 includes a server 10 and a plurality of user terminals 20 and 201 to 20N ("N" is an arbitrary integer), each of which is used by a user of the system. In this regard, a configuration of the system 100 is not limited to this configuration. The system 100 may be configured so that a plurality of users uses a single user terminal, or may be configured so as to include a plurality of servers.

Each of the server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The system 100 includes the server 10 and the plurality of user terminals 20, 201 to 20N, whereby various kinds of functions for carrying out various kinds of processes in response to an operation of the user are realized.

The server 10 is managed by an administrator of the system 100, and has various kinds of functions to provide information regarding the various kinds of processes to the plurality of user terminals 20, 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processes, such as a control section and a communicating section, as a computer. However, its explanation herein is omitted. Further, in the system 100, it is preferable that the server 10 manages various kinds of information from a point of view to reduce a processing load on each of the plurality of user terminals 20, 201 to 20N. However, a storage region may be provided in a state that the server 10 can access the storage region. For example, the server 10 may be configured so as to be provided with a dedicated storage region outside the server 10.

Figure 2:
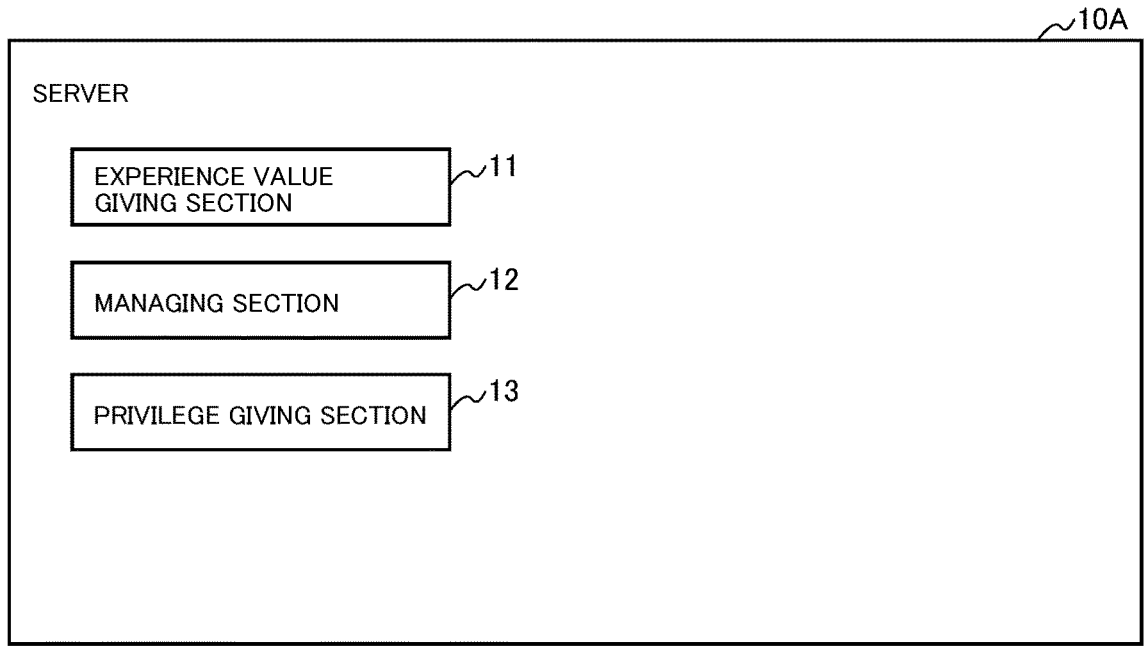
FIG. 2 is a block diagram showing a configuration of a server corresponding to at least one of the embodiments according to the present invention.

FIG. 2 is a block diagram showing a configuration of a server 10A, which is an example of the configuration of the server 10. As shown in FIG. 2, the server 10A at least includes an experience value giving section 11, a managing section 12, and a privilege giving section 13.

The experience value giving section 11 has a function to give an experience value to an object on the basis of a result of an event that occurs in accordance with progress of a video game.

Here, the word "progress of the video game" means occurrence of various kinds of progress or changes and the like that can be generated in the video game. As one example of the phrase "occurrence of various kinds of progress or changes and the like that can be generated in the video game", there are progress of time, a change in a parameter of a game element, update of a specific status or a flag, or an operational input by the user, and the like.

Further, the event means an event or occurrence that can occur in the video game. The configuration to realize an event is not limited particularly. However, it is preferable that the event proceeds when the user operates an object. As an example of such a configuration, there is a configuration in which success or failure determination is carried out by means of whether an object that acts in response to an operation of the user reaches a predetermined problem or not. As examples of the event, there are a so-called quest and a battle. Further, as examples of the problem, there are reaching of a predetermined position, and defeat of an enemy character.

Further, the result of the event means a result of an event or occurrence that may occur in the video game. As examples of the result of the event, there are a final result of an event or occurrence that may occur in the video game (for example, a result of the success or failure determination carried out by mean of whether to reach the problem or not), a halfway result of the event or occurrence (for example, an intermediate result of the problem), and a case of tackling the event or occurrence (for example, a case of tackling the problem).

Further, the object means an operation subject and a virtual object in the video game. As examples of the object, there are an item and a character in the video game and the user. Further, as examples of the character, there are a virtual person, a living thing, and a monster in the video game. Further, the display mode of the object is not limited particularly. For example, there is display by a virtual card.

Further, the experience value means a numerical value for expressing a degree of growth. As examples of the experience value, there are an increase based on a result of an event, and an increase or decrease according to a result of an event. The configuration to give an experience value is not limited particularly. However, it is preferable that it is configured to give an experience value on the basis of a result of an event. Further, the configuration to give the experience value may be configured so as to give one kind of experience value to one object. Alternatively, the configuration to give the experience value may be configured so as to give multiple kinds of experience values to the one object.

In this regard, in the present embodiment, explanation will be made using the word "experience value". However, one used as the numerical value for expressing the degree of growth is not limited to the experience value. The system 100 may be configured so as to use a simple point as the numerical value for expressing the degree of growth. Namely, the system 100 may be configured so as to give the point to an object.

The managing section 12 has a function to manage a level of the object on the basis of a given experience value.

Here, the level means a quality, a value, the degree of difficulty, or a stage of strength. In the level, an experience value required to reach a next stage is set up for every stage, and a stage to become an upper limit is set up. Therefore, an experience value required to reach a stage that becomes the upper limit is set up to the level. As examples of the level, there are a rank, a grade, and a class. The configuration to manage the level may be configured so as to manage one kind of level to one object. Alternatively, the configuration to manage the level may be configured so as to manage multiple kinds of levels to the one object.

Further, the word "manage" means to control processes regarding a level. Further, calculating processing, determining processing, and updating processing are included in the process regarding the level. Further, as one example of the calculating processing mentioned herein, there is a process to add the given experience value to an accumulated experience value. Further, as one example of the determining processing mentioned herein, there is a process to determine whether to reach a next level or not on the basis of the accumulated experience value. Further, as examples of the updating processing mentioned herein, there are a process to update an accumulated experience value of the object stored in a storage region, and a process to update level data of the object that is stored in the storage region when it is determined that the level reaches a next level.

The privilege giving section 13 gives a privilege on the basis of an experience value that has been given and exceeds a value required to reach an upper limit of the level (hereinafter, referred to as an "excessive experience value").

Here, the upper limit of the level means a situation where the level reaches a fixed value (that is, the upper limit thereof) and the experience value that can be accumulated in order to raise the level thus reaches the upper limit thereof. In other words, the upper limit of the level means a situation where a total of the experience values given to the object reaches the upper limit thereof.

Further, the privilege means a benefit that is given specially. The configuration of the privilege may be an effect or a thing by which anything influences on the video game. As examples of the privilege, there are an effect by which anything influences on the user or a character (for example, release of buff or a new skill), an effect by which anything influences on a quest or a stage (for example, release of the buff or a new stage), and item, and a virtual currency.

Further, the word "give" means to confer and give. The configuration of the subject to which a privilege is given is not limited particularly. As examples of the subject to which a privilege is given, there are an object (for example, an item, a character, or the user), an event, and a group that has a special relationship with the user (for example, a guild, or a clan).

Each of the plurality of user terminals 20, 201 to 20N is managed by a user, and is configured by a communication terminal, such as a cellular phone terminal, a PDA (Personal Digital Assistants), a mobile game device, and a so-called wearable divide, by which the user can play a network delivery type video game, for example. In this regard, a configuration of the user terminal that the system 100 can include is not limited to the examples described above. It may be a configuration in which the user can recognize the video game. As other examples of the user terminal, there are a combination of various kinds of communication terminals, a personal computer, and a stationary game device.

Further, each of the plurality of user terminals 20, 201 to 20N is connected to the communication network 30, and includes hardware (for example, a display device for displaying a game image) and software for carrying out various kinds of processing by communicating with the server 10. In this regard, each of the plurality of user terminals 20, 201 to 20N may be configured so as to be capable of directly communicating with each other without the server 10.

Next, an operation of the system 100 according to the present embodiment will be described.

Figure 3:
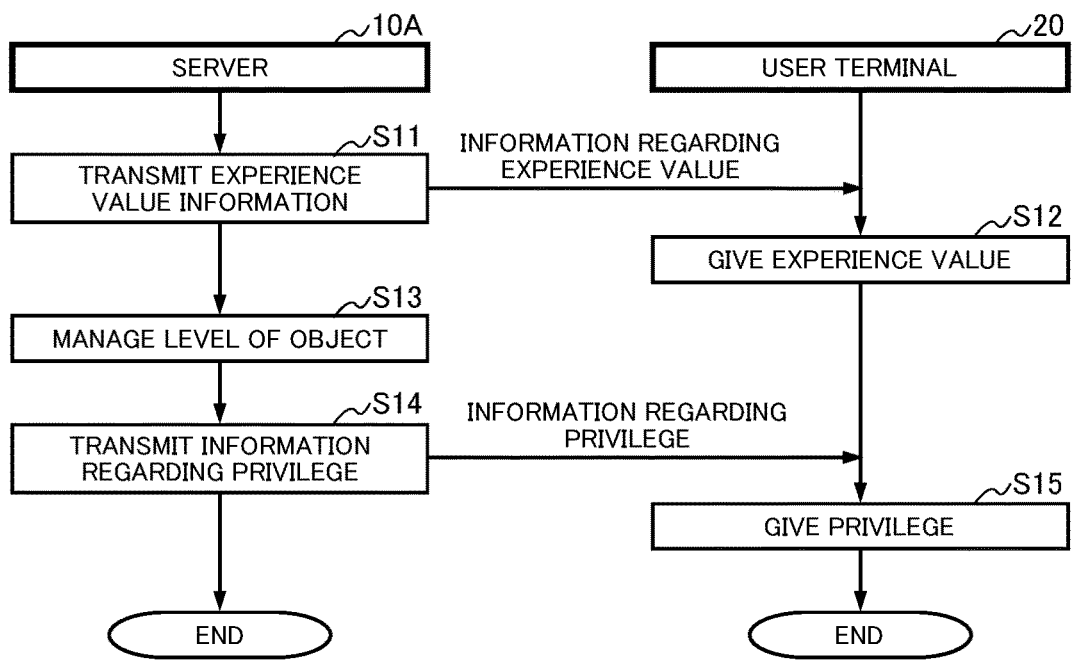
FIG. 3 is a flowchart showing an example of game related processing corresponding to at least one of the embodiments according to the present invention.

FIG. 3 is a flowchart showing an example of processing regarding the video game (hereinafter, referred to as "game related processing"), which is carried out by the system 100. In the game related processing according to the present embodiment, processing to cause an event to proceed is carried out. Hereinafter, the case where the server 10A and the user terminal 20 (hereinafter, referred to as a "terminal 20") carry out the game related processing will be described as an example.

In the game related processing, the server 10A first transmits information regarding an experience value to be given to an object to the terminal 20 on the basis of a result of an event (Step S11).

The terminal 20 gives the experience value to the object on the basis of the information received from the server 10A in accordance with the result of the event that occurs in accordance with progress of the video game (Step S12).

The server 10A manages a level of the object on the basis of the given experience value (Step S13).

The server 10A transmits, to the terminal 20, information regarding a privilege to be given to the object on the basis of an excessive experience value (Step S14). In this regard, the server 10A may be configured so as not to transmit the information regarding the privilege or to transmit information indicating that no privilege is given to the object in a case where the excessive experience value does not reach a predetermined value and no privilege is thus given to the object.

On the basis of the information received from the server 10A, the terminal 20 gives a privilege based on the excessive experience value (Step S15), and terminates the processing herein.

Figure 4:
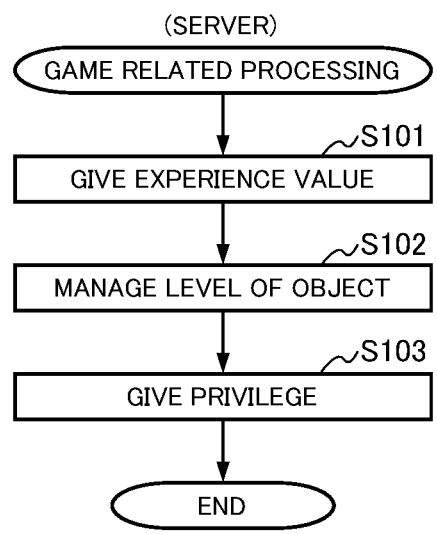
FIG. 4 is a flowchart showing an example of an operation of a server side in the game related processing corresponding to at least one of the embodiments according to the present invention.

FIG. 4 is a flowchart showing an example of an operation of the server 10A side in the game related processing. Here, an operation of the server 10A in the system 100 will be described again.

In the game related processing, the server 10A first gives an experience value to an object on the basis of a result of an event that occurs in accordance with progress of a video game (Step S101), and manages a level of the object on the basis of the given experience value (Step S102). The server 10A then gives a privilege to the object on the basis of an excessive experience value (Step S103), and terminates the processing herein.

Figure 5:
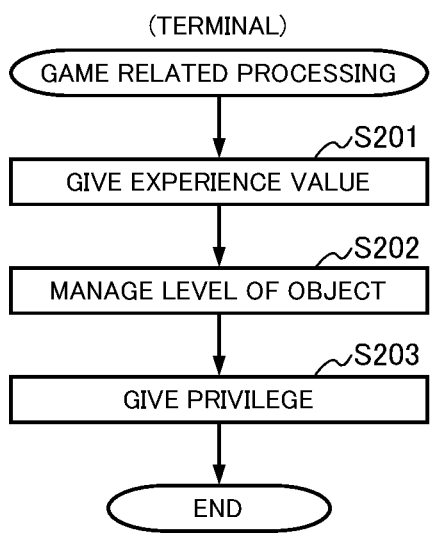
FIG. 5 is a flowchart showing an example of an operation of a terminal side in the game related processing corresponding to at least one of the embodiments according to the present invention.

FIG. 5 is a flowchart showing an example of an operation of the terminal 20 side in a case where the terminal 20 carries out the game related processing. Hereinafter, the case where the terminal 20 carries out the game related processing by a single body will be described as an example. In this regard, the terminal 20 is configured so as to include the similar functions to those of the server 10 except for reception of various kinds of information from the server 10. For this reason, its description is omitted from a point of view to avoid repeated explanation.

In the game related processing, the terminal 20 first gives an experience value to an object on the basis of a result of an event that occurs in accordance with progress of the video game (Step S201); manages a level of the object on the basis of the given experience value (Step S202); gives a privilege on the basis of an excessive experience value (Step S203), and terminates the processing herein.

As explained above, as one side of the first embodiment, the server 10A for controlling progress of the video game is configured so as to include the experience value giving section 11, the managing section 12, and the privilege giving section 13. Thus, the experience value giving section 11 gives the experience value to the object on the basis of the result of the event that occurs in accordance with progress of the video game; the managing section 12 manages the level of the object on the basis of the given experience value; and the privilege giving section 13 gives the privilege on the basis of the experience value that has been given and exceeds the value required to reach the upper limit of the level. Therefore, it becomes possible to prevent a motivation of the user to continue the video game from reducing.

Namely, as one side of the first embodiment, in a situation where the experience value that is to be given in order to raise the level reaches the upper limit, it is possible to cause the user to have a next goal by giving the privilege on the basis of the excessive experience value. Thus, this makes it possible to prevent a motivation of the user to continue the video game from reducing.

Moreover, as one side of the first embodiment, in a situation where the experience value that is to be given in order to raise the level reaches the upper limit (including a situation where an experience value, which is to be accumulated when the level reached the upper limit thereof in a phase of the video game to give an experience value, is not accumulated), it is possible to cause the user to have a next goal by giving the privilege on the basis of the excessive experience value. Therefore, it becomes possible to improve interest in or the taste of the video game by using the situation that the level reaches the upper limit thereof.

In this regard, it has not been mentioned particularly in the example of the first embodiment described above. However, the system 100 may be configured so as to: give an in-game currency in place of the experience value on the basis of the result of the event that occurs in accordance with progress of the video game; manage an in-game currency possessed by the object (for example, the user) on the basis of the given in-game currency; and give a privilege on the basis of part of the given in-game currency in a case where the possessed in-game currency exceeds a possession upper limit of the in-game currency. As one side of such an embodiment, it is possible to prevent a motivation of the user to continue the video game from reducing. As an example of the in-game currency, there is a gold.

Second Embodiment

Figure 6:
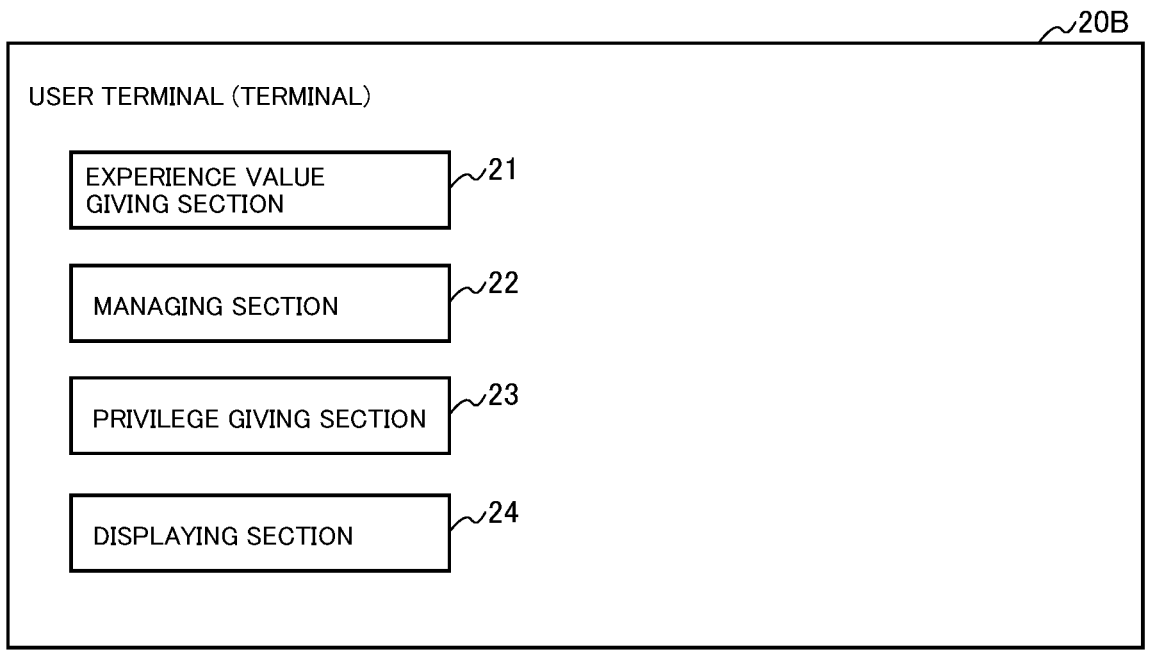
FIG. 6 is a block diagram showing a configuration of a user terminal corresponding to at least one of the embodiments according to the present invention.

FIG. 6 is a block diagram showing a configuration of a user terminal 20B (hereinafter, referred to as a "terminal 20B"), which is an example of the user terminal 20. In the present embodiment, the terminal 20B at least includes an experience value giving section 21, a managing section 22, a privilege giving section 23, and a displaying section 24.

The displaying section 24 has a function to cause a display device to display a game image according to progress of the video game on a display screen. Further, the displaying section 24 has a function to cause the display device to display a first image in the game image in a case where a level does not reach an upper limit thereof. The first image indicates an experience value required to reach a next level. Moreover, the displaying section 24 has a function to cause the display device to display a second image in the game image in a case where the level reaches the upper limit thereof. The second image expresses that the level is the upper limit thereof and the experience value is accumulated in order to give the privilege in a form the same or corresponding to that of the first image.

Here, each of the first image and the second image means an image that indicates, to the user, an experience value required to reach a certain stage (hereinafter, the first image or the second image may be referred to as a "required experience value image"). As an example of the certain stage, there is giving of a next level and/or a next privilege. Further, as examples of the required experience value image, there are a numerical value and a gauge. As examples of the gauge, there are a circular gauge and a bar-shaped gauge.

Figure 7:
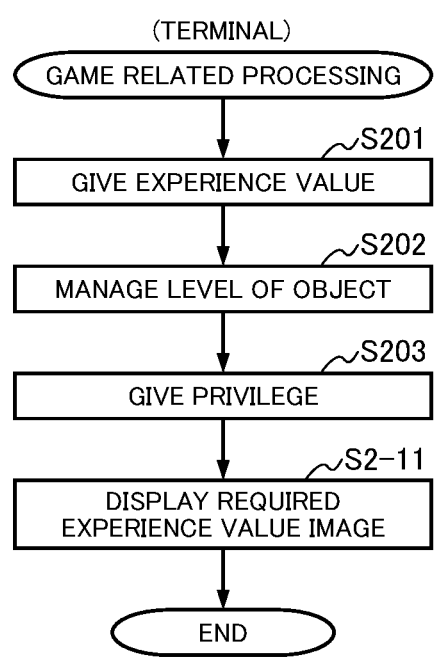
FIG. 7 is a flowchart showing an example of the game related processing corresponding to at least one of the embodiments according to the present invention.

FIG. 7 is a flowchart showing an example of the game related processing carried out by the terminal 20. Hereinafter, an operation of the terminal 20B will be described as an example. In this regard, an operation of the terminal 20B together with the server 10 is omitted from a point of view to avoid repeated explanation.

When a privilege is given (Step S203), the terminal 20B causes the display device to display the required experience value image in the game image (Step S2-11). More specifically, in a case where the level does not reach the upper limit, the terminal 20B generates image information for causing the display device to display the first image, which indicates an experience value required to reach a next level, in the game image. On the other hand, in a case where the level reaches the upper limit thereof, the terminal 20B generates image information for causing the display device to display the second image, which expresses that the level is the upper limit thereof and the experience value is accumulated in order to give the privilege in a form the same as or corresponding to that of the first image, in the game image. Then, the terminal 20B causes the display device to display a game image on the display screen on the basis of the generated image information.

As explained above, as one side of the second embodiment, the user terminal 20B is configured so as to include the experience value giving section 21, the managing section 22, the privilege giving section 23, and the displaying section 24. Thus, the displaying section 24 causes the display device included in the user terminal 20B to display the game image according to progress of the video game on the display screen. Further, the displaying section 24 causes the display device to display the required experience value image, which indicates the experience value required to reach a next level, in the game image in a case where the level does not reach the upper limit thereof. Moreover, the displaying section 24 causes the display device to display the second image, which expresses that the level is the upper limit thereof and the experience value is accumulated in order to give the privilege in a form the same or corresponding to that of the first image, in the game image in a case where the level reaches the upper limit thereof. Therefore, it becomes possible to prevent a motivation of the user to continue the video game from reducing.

Namely, as one side of the second embodiment, the required experience value image, which indicates how many experience value is it required in order to reach a next stage, is displayed regardless of whether the level reaches the upper limit thereof or not. Therefore, it becomes possible to cause the user to realize that the experience value is given to the object in a phase of the video game to give the experience value. Thus, this makes it possible to prevent a motivation of the user to continue the video game from reducing.

In this regard, the displaying section 24 may be configured so as to include a function to cause the display device to display the required experience value image when the level reaches the upper limit thereof (that is, the second image) in the game image in the same mode as the display mode of the required experience value image when the level does not reach the upper limit thereof (that is, the first image). As an example of such a configuration, there is a configuration in which a display area of the first image and a display area of the second image (which are respectively display areas in each of which a state to be extended is displayed) becomes the same area.

Third Embodiment

Figure 8:
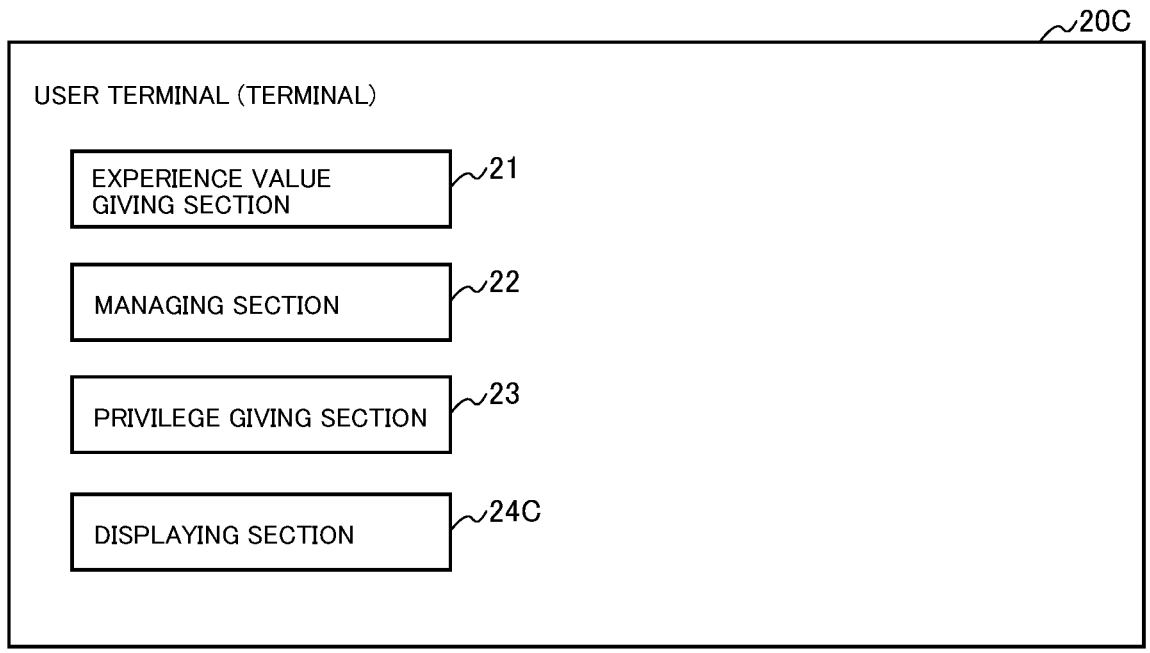
FIG. 8 is a block diagram showing a configuration of the user terminal corresponding to at least one of the embodiments according to the present invention.

FIG. 8 is a block diagram showing a configuration of a user terminal 20C (hereinafter, referred to as a "terminal 20C"), which is an example of the user terminal 20. In the present embodiment, the terminal 20C at least includes an experience value giving section 21, a managing section 22, a privilege giving section 23, and a displaying section 24C.

The displaying section 24C has a function to cause a display device to display a first image in a game image in a case where a level does not reach an upper limit thereof. The first image changes a form thereof on the basis of a ratio between an experience value accumulated in a current level and an experience value required to reach a next level. Further, the displaying section 24C has a function to cause the display device to display a second image in the game image in a case where the level reaches the upper limit thereof. The second image changes a form thereof on the basis of a ratio between an experience value that has been accumulated after the level reached the upper limit thereof and an experience value required to give a privilege next time.

Here, the form means a shape or a status when viewed from the user. As examples of the form of the required experience value image, there are a form in which a gauge is extending, a form in which a color is becoming deep, and a form in which a filled ratio increases.

Figure 9:
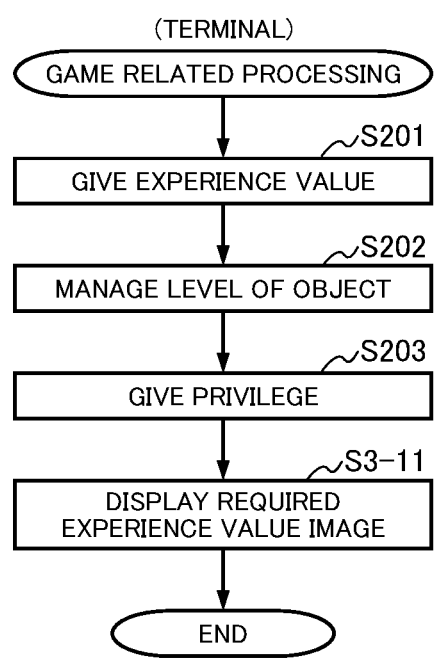
FIG. 9 is a flowchart showing an example of the game related processing corresponding to at least one of the embodiments according to the present invention.

FIG. 9 is a flowchart showing an example of the game related processing carried out by the terminal 20. Hereinafter, an operation of the terminal 20C will be described as an example. In this regard, an operation of the server 10 is omitted from a point of view to avoid repeated explanation.

Subsequently, when the privilege is given to the object (Step S203), the terminal 20C causes a display device to display a required experience value image, which changes a form thereof on the basis of the accumulated experience value, in the game image (Step S3-11). More specifically, in a case where the level does not reach the upper limit thereof, the terminal 20C causes the display device to display the first image in the game image. The first image changes the form thereof on the basis of the ratio between the experience value accumulated in the current level and the experience value required to reach a next level. On the other hand, in a case where the level does not reach the upper limit thereof, the terminal 20C causes the display device to display the second image in the game image. The second image changes the form thereof on the basis of the ratio between the experience value that has been accumulated after the level reached the upper limit thereof and the experience value required to give a privilege next time.

As explained above, as one side of the third embodiment, the user terminal 20C is configured so as to include the experience value giving section 21, the managing section 22, the privilege giving section 23, and the displaying section 24C. Thus, in a case where the level does not reach the upper limit, the displaying section 24C causes the display device to display the first image in the game image, the first image changing the form thereof on the basis of the ratio between the experience value accumulated in the current level and the experience value required to reach a next level; and in a case where the level reaches the upper limit, the displaying section 24C causes the display device to display the second image in the game image, the second image changing the form thereof on the basis of the ratio between the experience value that has been accumulated after the level reached the upper limit and the experience value required to give a privilege next time. Therefore, it becomes possible to prevent a motivation of the user to continue the video game from reducing.

Namely, as one side of the third embodiment, the terminal 20C continues the video game from a situation that the level does not reach the upper limit thereof even in a case where the level has reached the upper limit thereof; and causes the display device to dynamically display an experience value required to reach a next stage. Therefore, it becomes possible to prevent a motivation of the user to continue the video game from reducing.

In this regard, it has not been mentioned particularly in the example of the third embodiment. However, the terminal 20C may be configured so that the displaying section 24C changes a form of an image on the basis of a ratio between an experience value that has been accumulated after the privilege is given and an experience value required to give a privilege next time in a case where a privilege is given after the level reached the upper limit.

In this regard, it has not been mentioned particularly in the example of the third embodiment. However, the terminal 20C may be configured so that: the displaying section 24C causes the display device to display the first image, in which a length of a gauge changes on the basis of the experience value accumulated in the current level and the maximum length of the gauge corresponds to the experience value required to reach a next level, in the game image in a case where the level does not reach the upper limit thereof; and the displaying section 24C causes the display device to display the second image, in which a length of a gauge changes on the basis of the experience value that has been accumulated after the level reached the upper limit thereof and the maximum length of the gauge corresponds to the experience value required to give a privilege next time, in the game image in a case where the level reaches the upper limit thereof.

Fourth Embodiment

Figure 10:
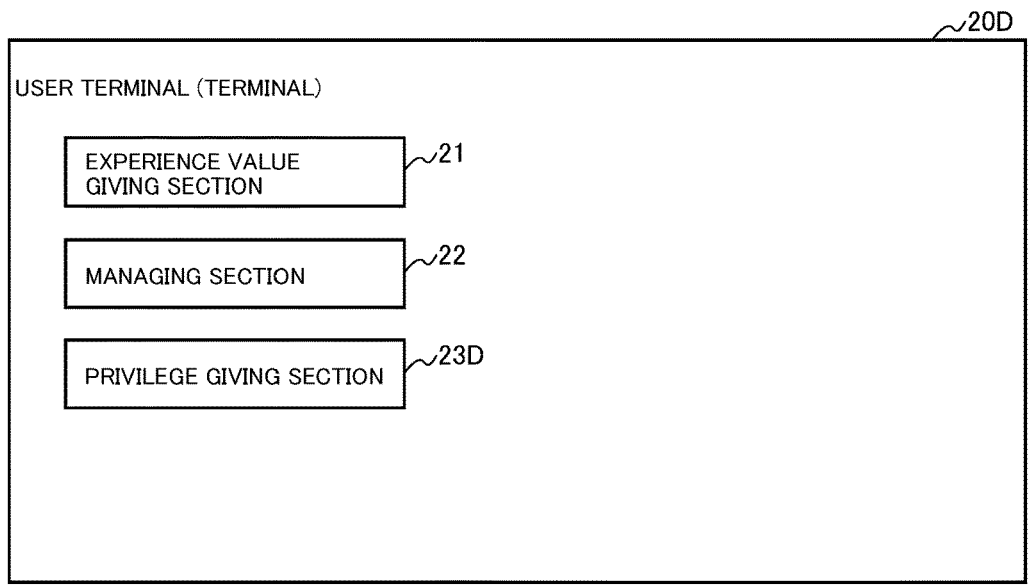
FIG. 10 is a block diagram showing a configuration of the user terminal corresponding to at least one of the embodiments according to the present invention.

FIG. 10 is a block diagram showing a configuration of a user terminal 20D (hereinafter, referred to as a "terminal 20D"), which is an example of the user terminal 20. In the present embodiment, the terminal 20D at least includes an experience value giving section 21, a managing section 22, and a privilege giving section 23D.

The privilege giving section 23D has a function to give a special privilege to an object in a case where privileges are given for the predetermined number of times.

Here, the special privilege is one kind of benefits that are given specially, and is prepared in advance as a privilege, which is different from a normal privilege. As an example of the special privilege, there is a more expensive benefit in the video game than a normal privilege.

Figure 11:
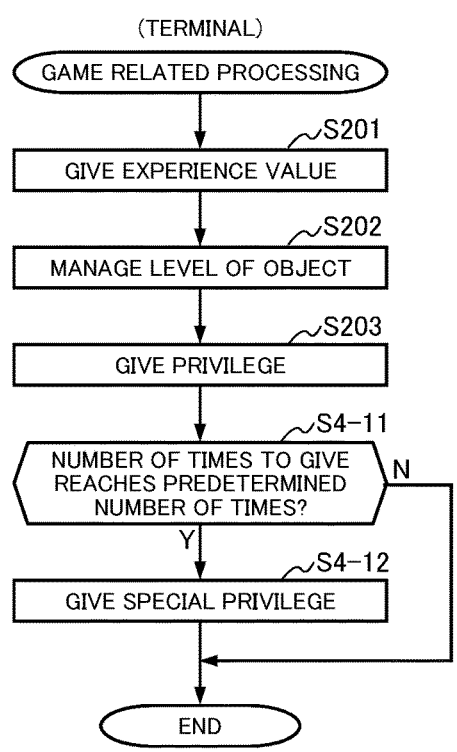
FIG. 11 is a flowchart showing an example of the game related processing corresponding to at least one of the embodiments according to the present invention.

FIG. 11 is a flowchart showing an example of the game related processing carried out by the terminal 20. Hereinafter, an operation of the terminal 20D will be described as an example. In this regard, an operation of the terminal 20D together with the server 10 is omitted from a point of view to avoid repeated explanation.

When the privilege is given (Step S203), the terminal 20D determines whether the number of times to give the privilege to the object reaches the predetermined number of times or not (Step S4-11).

In a case where it is determined that the number of times to give the privilege to the object does not reach the predetermined number of times ("No" at Step S4-11), the terminal 20D terminates the processing herein. On the other hand, in a case where it is determined that the number of times to give the privilege to the object reaches the predetermined number of times ("Yes" at Step S4-11), the terminal 20D gives a special privilege (Step S4-12), and terminates the processing herein.

As explained above, as one side of the fourth embodiment, the user terminal 20D is configured so as to include the experience value giving section 21, the managing section 22, and the privilege giving section 23D. Thus, the privilege giving section 23D gives the special privilege, which is different from the (normal) privilege, to the object in a case where the privileges are given for the predetermined number of times. Therefore, it becomes possible to prevent a motivation of the user to continue the video game from reducing.

Namely, as one side of the fourth embodiment, it becomes possible to carry out motivating the user to obtain an experience value even after the level reached the upper limit. For this reason, it becomes possible to prevent a motivation of the user to continue the video game from reducing.

Fifth Embodiment

Figure 12:
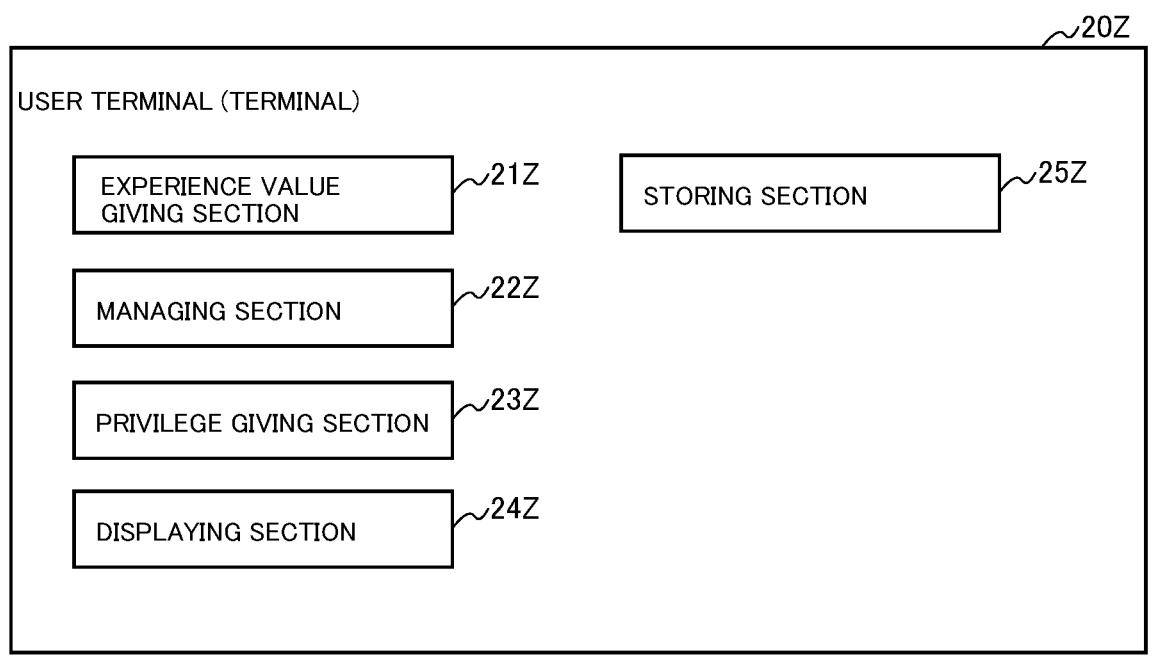
FIG. 12 is a block diagram showing a configuration of the user terminal corresponding to at least one of the embodiments according to the present invention.

FIG. 12 is a block diagram showing a configuration of a user terminal 20Z (hereinafter, referred to as a "terminal 20Z"), which is an example of the user terminal 20. In the present embodiment, the terminal 20Z at least includes an experience value giving section 21Z, a managing section 22Z, a privilege giving section 23Z, a displaying section 24Z, and a storing section 25Z.

Further, in the present embodiment, a next level entered by accumulating the experience value or a phase of the video game to give a next privilege may be referred to as a "next stage".

The experience value giving section 21Z has a function to give an experience value to an object on the basis of a result of an event that occurs in accordance with progress of the video game. More specifically, the experience value giving section 21Z specifies a result of an event, and specifies an experience value to be given to an object. Then, the experience value giving section 21Z refers to the storing section 25Z to update object information by adding the specified experience value to an accumulated experience value. Even in a case where a level reaches an upper limit thereof, the experience value giving section 21Z adds the specified experience value to the accumulated experience value.

The managing section 22Z has a function to manage a level of the object on the basis of the given experience value. More specifically, the managing section 22Z determines whether an experience value that can be accumulated in order for an accumulated experience value to raise the level exceeds an upper limit thereof (that is, the upper limit of the level) or not. Further, in a case where it is determined the level does not exceeds the upper limit, the managing section 22Z determines whether the accumulated experience value becomes an accumulated experience value required to reach a next level or more. Then, in a case where it is determined that the accumulated experience value becomes the accumulated experience value required to reach the next level or more, the managing section 22Z updates the object information by incrementing the level.

The privilege giving section 23Z has a function to give a privilege to an object on the basis of an excessive experience value. More specifically, the privilege giving section 23Z refers to a privilege table to determine whether or not the accumulated experience value becomes an accumulated experience value, at which a privilege is given next time, or more. The privilege giving section 23Z gives a privilege on the basis of a determination result. When the privilege is given, the privilege giving section 23Z refers to the object information to update the object information by incrementing the number of times to give the privilege. In this regard, the accumulated experience value to which it is referred when to determine whether a privilege is to be given or not becomes one obtained by adding the excessive experience value to the upper limit of the level. Therefore, the privilege giving section 23Z gives the privilege to the object on the basis of the excessive experience value.

The displaying section 24Z has a function to cause a display device to display a game image according to progress of the video game on a display screen. In particular, the displaying section 24Z has a function to cause the display device to display a first image in the game image in a case where the level does not reach the upper limit thereof. The first image changes a form thereof on the basis of a ratio between an experience value accumulated in a current level and an experience value required to reach a next level. Further, the displaying section 24Z has a function to cause the display device to display a second image in the game image in a case where the level reaches the upper limit thereof. The second image expresses that the level is the upper limit thereof and the experience value is accumulated in order to give a privilege in a form the same or corresponding to that of the first image. More specifically, in a case where the level does not reach the upper limit thereof, the displaying section 24Z refers to the object information and level information to calculate a ratio between the experience value accumulated in the current level and the experience value required to reach a next level. The displaying section 24Z then generates image information for causing the display device to display the first image, which has a form based on the calculated ratio, in the game image. On the other hand, in a case where the level reaches the upper limit thereof, the displaying section 24Z calculates a ratio between an experience value that has been accumulated after the level reached the upper limit thereof and an experience value required to give a privilege next time. Then, the displaying section 24Z generates image information for displaying the second image in the game image in a form based on the calculated ratio. Moreover, the displaying section 24Z calculates a ratio between an experience value that has been accumulated after the privilege is given to the object and the experience value required to give a privilege next time in a case where the privilege is given to the object after the level reaches the upper limit thereof. Then, the displaying section 24Z generates image information for causing the display device to display a third image in a form based on the calculated ratio in the game image.

Here, the third image means an image that expresses and indicates an experience value required to reach a certain stage to the user. As an example of the certain stage in the third image, there is giving of the next privilege. Further, as examples of the third image, there are a numerical value and a gauge. As examples of the gauge, there are a circular gauge and a bar-shaped gauge.

Further, the phrase "cause the display device to display an image on the display screen" means causing each of the user terminals 20, 201 to 20N to output an image on the display device included therein by means of communication using the communication network 30. As an example of the configuration to cause the display device to display an image, there is a configuration in which information (image information) generated at a server side is transmitted to each side of the user terminals 20, 201 to 20N. In this regard, the configuration of the image information is not limited particularly. For example, the image information may be information in which an image is compressed, or information for causing each side of the user terminals 20, 201 to 20N to generate an image. As an example of the information in which an image is compressed, there is one used in a cloud game (for example, MPEG). Further, as an example of the information for causing each side of the user terminals 20, 201 to 20N to generate an image, there is one used in an online game (for example, positional information).

The storing section 25Z is a storage medium for storing various kinds of information used for progress of the video game. The object information, the level information, and the privilege information are stored in the storing section 25Z.

FIG. 13 is an explanatory drawing for explaining an example of a storage state of the object information. The object information is information regarding an object. As shown in FIG. 13, a level, an upper limit of the level, an accumulated experience value, an image, and various kinds of parameters are contained in the object information. Various kinds of information contained in the object information are updated in response to an update instruction of the experience value giving section 21Z, the managing section 22Z, or the privilege giving section 23Z.

FIG. 14 is an explanatory drawing for explaining an example of a storage state of the level information. The level information is information regarding a level. As shown in FIG. 14, a level, and an accumulated experience value to reach a next level are contained in the level information. The level information may be configured so as to be stored for each ID. Alternatively, the level information may be configured so as to be stored in accordance with a classification of an ID (for example, each degree of rare).

FIG. 15 is an explanatory drawing for explaining an example of a storage state of the privilege information. The privilege information is information regarding a privilege. As shown in FIG. 15, the number of times to give (giving steps), an accumulated experience value to reach giving of a next privilege, and a privilege to be given are contained in the privilege information.

Figure 16:
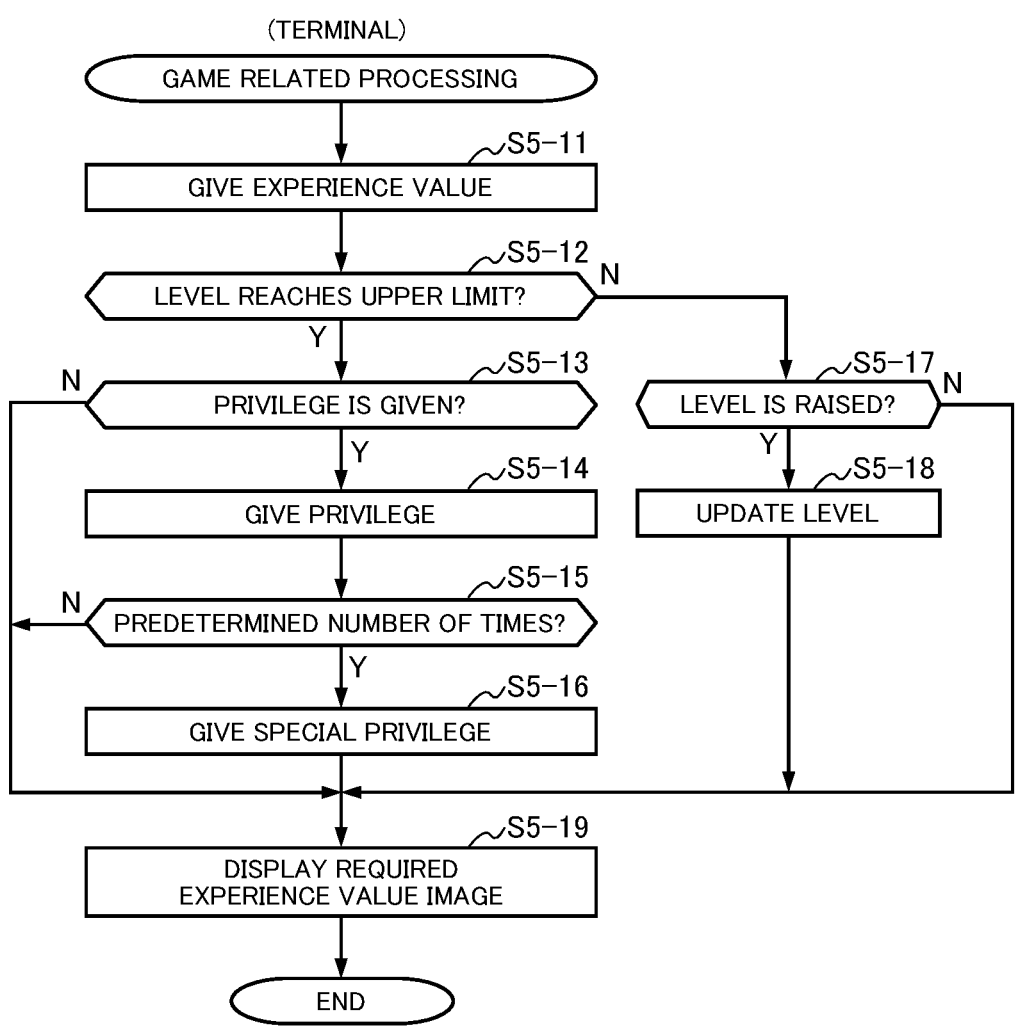
FIG. 16 is a flowchart showing an example of the game related processing corresponding to at least one of the embodiments according to the present invention.

FIG. 16 is a flowchart showing an example of the game related processing carried out by the system 100. Hereinafter, an operation of the terminal 20Z will be described as an example. In this regard, in the following explanation, processing, which carries out in a case where an event occurs in accordance with progress of the video game and a phase that an experience value is to be given in the event comes, will be described. Further, in the following explanation, the case where a character A and a character B operated by a user U are subjects to which an experience value is given, a level of the character A reached an upper limit thereof, and a level of the character B does not reach an upper limit thereof will be described as an example.

In the game related processing, the terminal 20Z first gives an experience value (Step S5-11). For example, the terminal 20Z refers to information on an event thus carried out and the object information to specify the character A and the character B as subjects to which the experience value is given, and updates an accumulated experience value that is contained in each of object information corresponding to the specified character A and object information corresponding to the specified character B.

Subsequently, the terminal 20Z determines whether a level of a subject to which an experience value is given reaches the upper limit or not (Step S5-12). For example, the terminal 20Z determines that the level of the character A reaches the upper limit. On the other hand, the terminal 20Z determines that the level of the character B does not reach the upper limit.

In a case where it is determined that the level of the subject to which the experience value is given reaches the upper limit thereof ("Yes" at Step S5-12), the terminal 20Z refers to the privilege information to determine whether a privilege is to be given or not (Step S5-13). In a case where it is determined that the privilege is not given ("No" at Step S5-13), the terminal 20Z causes the processing flow to shift to Step S5-19.

In a case where it is determined that the privilege is to be given ("Yes" at Step S5-13), the terminal 20Z gives the privilege to the user U (Step S5-14). For example, the terminal 20Z carries out a process to add an item, which becomes a privilege, to item information owned by the user.

When the privilege is given, the terminal 20Z determines whether the number of times to give the privilege to the object becomes the predetermined number of times or not (Step S5-15). In a case where it is determined that the number of times to give the privilege to the object does not become the predetermined number of times ("No" at Step S5-15), the terminal 20Z causes the processing flow to shift to Step S5-19.

In a case where it is determined that the number of times to give the privilege to the object becomes the predetermined number of times ("Yes" at Step S5-15), the terminal 20Z gives a special privilege to the user U (Step S5-16), and causes the processing flow to shift to Step S5-19.

On the other hand, in a case where it is determined that the level of the subject to which the experience value is given does not reach the upper limit thereof ("No" at Step S5-12), the terminal 20Z refers to the level information to determine whether the level is to be raised or not (Step S5-17). In a case where it is determined that the level is not to be raised ("No" at Step S5-17), the terminal 20Z causes the processing flow to shift to Step S5-19.

In a case where it is determined that the level is to be raised ("Yes" at Step S5-17), the terminal 20Z refers to object information to increment and update the level (Step S5-18), and causes the processing flow to shift to Step S5-19.

Subsequently, the terminal 20Z causes the display device to display a required experience value image in the game image (Step S5-19). Namely, the terminal 20Z causes the display device to display a game image regarding a result obtained by giving the experience value (hereinafter, referred to as a "given result") on the display screen. For example, the terminal 20Z causes the display device to display the first image in a case where the level does not reach the upper limit thereof. Further, for example, the terminal 20Z causes the display device to display the second image in a case where the level has reached the upper limit thereof and it is a stage where a privilege is given for the first time after the level reached the upper limit thereof. Moreover, for example, the terminal 20Z causes the display device to display the third image in a case where a privilege is given.

Figure 17A:
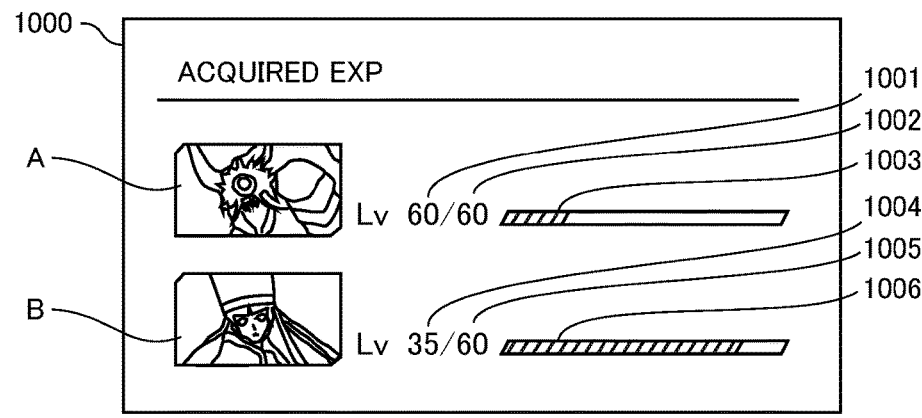
FIGS. 17A-17C are explanatory drawings for explaining an example of a display screen corresponding to at least one of the embodiments according to the present invention.
Figure 17B:
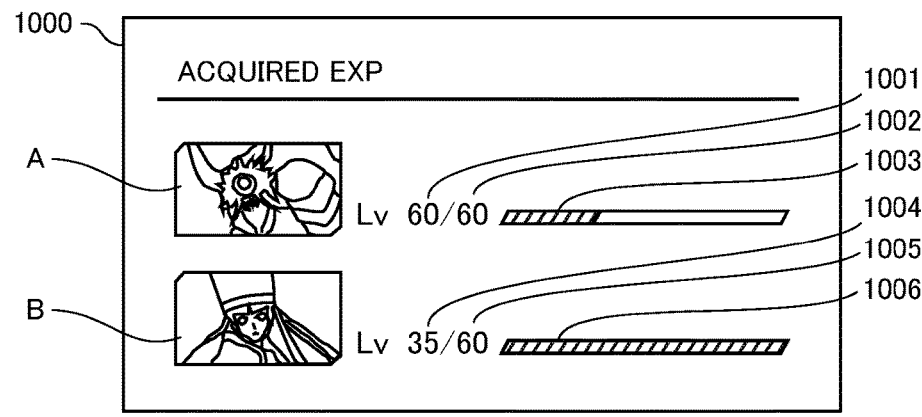
Figure 17C:
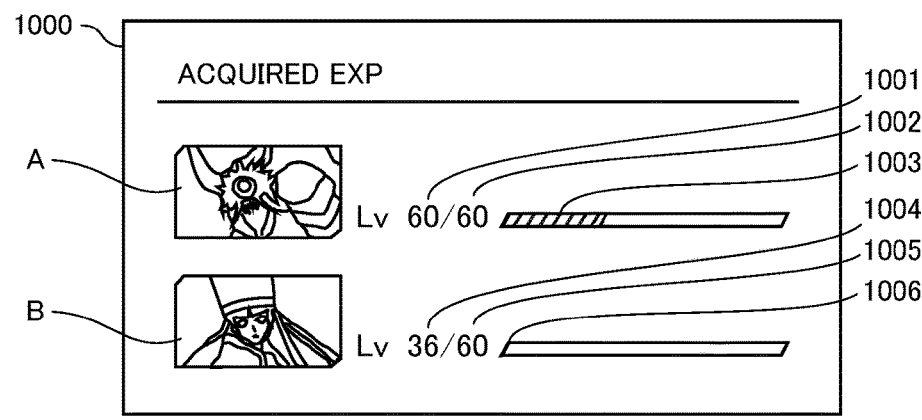

FIG. 17 is an explanatory drawing for explaining an example of the display screen. In particular, FIG. 17A, FIG. 17B, and FIG. 17C are explanatory drawings for explaining a change mode of the game image regarding the given result of the experience value. As shown in FIGS. 17A to 17C, a display screen 1000 contains the character A, a current level 1001 of the character A, an upper limit 1002 of a level of the character A, a required experience value gauge 1003 of the character A as the second image (that is, the required experience value image), the character B, a current level 1004 of the character B, an upper limit 1005 of a level of the character B, and a required experience value gauge 1006 of the character B as the first image (that is, the required experience value image). Each of the required experience value gauges 1003, 1006 according to the present embodiment is configured so that the gauge is gradually extending on the basis of an accumulated experience value in the reached stage regardless of whether the level reaches the upper limit thereof or not.

As shown in FIG. 17B, each of the required experience value gauges 1003, 1006 is configured so that a length of the gauge becomes the maximum length when the accumulated experience value (including an excessive experience value) becomes a value at which the level reaches a next stage (a value to reach the next level, or a value to reach a phase of the video game to give a next privilege). Then, as shown in FIG. 17C, each of the required experience value gauges 1003, 1006 is configured so that the length of the gauge is reset (that is, the length of the gauge becomes zero) when the accumulated experience value exceeds the value to reach the next stage. Then, each of the required experience value gauges 1003, 1006 is configured so that the gauge is again extending on the basis of an accumulated experience value in the reached stage. Further, as shown in FIG. 17C, when to reach the next stage, the length of the required experience value gauge 1006 is reset and the current level 1004 of the character B, which does not reach the upper limit 1005 of the level of the character B, increments.

When the required experience value image is displayed, the terminal 20Z terminates the processing herein.

As explained above, as one side of the fifth embodiment, the terminal 20Z for controlling progress of the video game is configured so as to include the experience value giving section 21Z, the managing section 22Z, the privilege giving section 23Z, the displaying section 24Z, and the storing section 25Z. Thus, the experience value giving section 21Z gives the experience value to the object on the basis of the result of the event that occurs in accordance with progress of the video game; the managing section 22Z manages the level of the object on the basis of the given experience value; and the privilege giving section 23Z gives the privilege on the basis of the experience value that has been given and exceeds the value required to reach the upper limit of the level. Therefore, it becomes possible to prevent a motivation of the user to continue the video game from reducing.

Namely, as one side of the fifth embodiment, in a situation where the experience value that is to be given in order to raise the level reaches the upper limit (including a situation where an experience value, which is to be accumulated when the level reached the upper limit thereof in a phase of the video game to give an experience value, is not accumulated), it is possible to cause the user to have a next goal by giving the privilege on the basis of the excessive experience value. Therefore, this makes it possible to prevent a motivation of the user to continue the video game from reducing.

Moreover, as one side of the fifth embodiment, in a situation where the experience value that is to be given in order to raise the level reaches the upper limit (including a situation where an experience value, which is to be accumulated when the level reached the upper limit thereof in a phase of the video game to give an experience value, is not accumulated), it is possible to cause the user to have a next goal by giving the privilege on the basis of the excessive experience value. Therefore, it becomes possible to improve interest in or the taste of the video game by using the situation that the level reaches the upper limit thereof.

Further, as one side of the fifth embodiment described above, the user terminal 20Z is configured so as to include the experience value giving section 21Z, the managing section 22Z, the privilege giving section 23Z, the displaying section 24Z, and the storing section 25Z. Thus, the displaying section 24Z causes the display device included in the user terminal 20Z to display the game image according to progress of the video game on the display screen; the displaying section 24Z causes the display device to display the first image, which indicates the experience value required to reach a next level in the game image in a case where the level does not reach the upper limit thereof; and the displaying section 24Z causes the display device to display the second image, which indicates the excessive experience value required to give a privilege next time, in the game image in a case where the level reaches the upper limit thereof. Therefore, it becomes possible to prevent a motivation of the user to continue the video game from reducing.

Further, as one side of the fifth embodiment described above, the user terminal 20Z is configured so as to include the experience value giving section 21Z, the managing section 22Z, the privilege giving section 23Z, the displaying section 24Z, and the storing section 25Z. Thus, the displaying section 24Z causes the display device to display the first image, which changes the form thereof on the basis of the ratio between the experience value accumulated in the current level and the experience value required to reach a next level, in the game image in a case where the level does not reach the upper limit thereof; and the displaying section 24Z causes the display device to display the second image, which changes the form thereof on the basis of the ratio between the experience value that has been accumulated after the level reached the upper limit thereof and the experience value required to give a privilege next time, in the game image in a case where the level reaches the upper limit thereof. Therefore, it becomes possible to prevent a motivation of the user to continue the video game from reducing.

Further, as one side of the fifth embodiment described above, the user terminal 20Z is configured so as to include the experience value giving section 21Z, the managing section 22Z, the privilege giving section 23Z, the displaying section 24Z, and the storing section 25Z. Thus, the privilege giving section 23Z gives the special privilege, which is different from the privilege, in a case where the privilege is given to the object for the predetermined number of times. Therefore, it becomes possible to prevent a motivation of the user to continue the video game from reducing.

As explained above, one or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, 201 to 20N and the server 10 carries out the various kinds of processing described above in accordance with various kinds of control programs (for example, a video game processing program) stored in the storage device with which the corresponding terminal or server is provided.

Further, the configuration of the system 100 is not limited to the configuration that has been explained as an example of each of the embodiments described above. For example, the system 100 may be configured so that the server 10 carries out a part or all of the processes that have been explained as the processes carried out by the user terminal. Alternatively, the system 100 may be configured so that any of the plurality of user terminals 20, 201 to 20N (for example, the user terminal 20) carries out apart or all of the processes that have been explained as the processes carried out by the server 10. Further, the system 100 may be configured so that a part or all of the storing sections included in the server 10 is included in any of the plurality of user terminals 20, 201 to 20N. Namely, the system 100 may be configured so that a part or all of the functions of any one of the user terminal 20 and the server 10 according to the system 100 is included in the other.

Further, the program product may be configured so as to cause a single apparatus that does not include a communication network to realize a part or all of the functions that have been explained as the examples of the respective embodiments described above.

APPENDIX

The explanation of the embodiments described above has been described so that the following inventions can be at least realized by a person having a normal skill in the art to which the present invention belongs.

(1)

A non-transitory computer-readable medium including a program product for causing a user terminal to realize functions to control progress of a video game,
wherein the functions include:
an experience value giving function configured to give an experience value to an object on the basis of a result of an event that occurs in accordance with progress of the video game;
a managing function configured to manage a level of the object on the basis of the given experience value; and
a privilege giving function configured to give a privilege to the object on the basis of an experience value that has been given and exceeds a value required to reach an upper limit of the level (hereinafter, referred to as an "excessive experience value").

(1-1)

The non-transitory computer-readable medium according to claim (1),
wherein the object includes a user and a character that is associated with the user.

(1-2)

The non-transitory computer-readable medium according to claim (1),
wherein the privilege giving function includes a function configured to give the privilege to the object or a user that is associated with the object.

(1-3)

The non-transitory computer-readable medium according to claim (1),
wherein the privilege giving function includes a function configured to determine whether a value of the excessive experience value satisfies a predetermined condition or not, and a function configured to give the privilege on the basis of a determination result.

(2)

The non-transitory computer-readable medium according to claim (1),
wherein the functions further include:
a displaying function configured to cause a display device included in the user terminal to display a game image according to progress of the video game on a display screen, and
wherein the displaying function includes:
a function configured to cause the display device to display a first image in the game image in a case where the level does not reach the upper limit thereof, the first image indicating an experience value required to reach a next level; and
a function configured to cause the display device to display a second image in the game image in a case where the level reaches the upper limit thereof, the second image expressing that the level is the upper limit thereof and the experience value is accumulate to give the privilege in a form the same as or corresponding to that of the first image.

(2-1)

The non-transitory computer-readable medium according to claim (2),
wherein the displaying function includes a function configured to cause the display device to display the first image, which is constituted by a numerical value or a gauge, in the game image.

(2-2)

The non-transitory computer-readable medium according to claim (2),
wherein the displaying function includes a function configured to cause the display device to display the first image, which is used when the level reaches the upper limit thereof, in the game image in a display mode the same as that of the first image that is used when the level does not reach the upper limit thereof.

(3)

The non-transitory computer-readable medium according to claim (2), wherein the displaying function includes:

a function configured to cause the display device to display the first image in the game image in a case where the level does not reach the upper limit thereof, the first image changing a form thereof on the basis of a ratio between an experience value accumulated in a current level and an experience value required to reach a next level; and a function configured to cause the display device to display the second image in the game image in a case where the level reaches the upper limit thereof, the second image changing a form thereof on the basis of a ratio between an experience value that has been accumulated after the level reached the upper limit thereof and an experience value required to give a privilege next time.

(3-1)

The non-transitory computer-readable medium according to claim (3), wherein the displaying function includes:

a function configured to cause the display device to display the first image in the game image in a case where the level does not reach the upper limit thereof, a length of a gauge in the first image changing on the basis of the experience value accumulated in the current level, a maximum length of the gauge corresponding to an experience value required to reach a next level; and a function configured to cause the display device to display the second image in the game image in a case where the level reaches the upper limit thereof, a length of a gauge in the second image changing on the basis of an experience value that has been accumulated after the level reached the upper limit thereof, a maximum length of the gauge corresponding to an experience value required to give a privilege next time.

(4)

The non-transitory computer-readable medium according to any one of claims (1) to (3), wherein the privilege giving function includes a function configured to give a special privilege, which is different from the privilege, in a case where the privilege is given to the object for the predetermined number of times.

(5)

A non-transitory computer-readable medium including a program product for causing a server to realize at least one function of the functions that the program product described in any one of claims (1) to (4) causes the user terminal to realize, the server being capable of communicating with the user terminal.

(6)

A computer into which the program product contained in the non-transitory computer-readable medium according to any one of claims (1) to (5) is installed.

(7)

A system for controlling progress of a video game, the system comprising a communication network, a server, and a user terminal, the system comprising:

an experience value giving section configured to give an experience value to an object on the basis of a result of an event that occurs in accordance with progress of the video game;

a managing section configured to manage a level of the object on the basis of the given experience value; and a privilege giving sect ion configured to give a privilege to the object on the basis of an experience value that has been given and exceeds a value required to reach an upper limit of the level (hereinafter, referred to as an "excessive experience value").

(8)

The system according to claim (7), wherein the server includes the experience value giving section, the managing section, and the privilege giving section, and wherein the user terminal includes:

a receiving section configured to receive information for displaying a game image from the server; and a displaying section configured to cause a display device to display the game image on a display screen on the basis of the information received by the receiving section.

(9)

A non-transitory computer-readable medium including a program product for causing a server to realize functions to control progress of a video game, wherein the functions include:

an experience value giving function configured to give an experience value to an object on the basis of a result of an event that occurs in accordance with progress of the video game;

a managing function configured to manage a level of the object on the basis of the given experience value; and a privilege giving function configured to give a privilege to the object on the basis of an experience value that has been given and exceeds a value required to reach an upper limit of the level (hereinafter, referred to as an "excessive experience value").

(10)

A non-transitory computer-readable medium including a program product for causing a user terminal to realize functions to control progress of a video game, wherein a server includes:

an experience value giving function configured to give an experience value to an object on the basis of a result of an event that occurs in accordance with progress of the video game;

a managing function configured to manage a level of the object on the basis of the given experience value; and a privilege giving function configured to give a privilege to the object on the basis of an experience value that has been given and exceeds a value required to reach an upper limit of the level (hereinafter, referred to as an "excessive experience value"), and wherein the functions include:

a receiving function configured to receive, from the server, information regarding the functions included in the server; and an inputting/outputting function configured to carry out an input or an output corresponding to the functions of the server.

(11)

A non-transitory computer-readable medium including a program product for causing a user terminal to realize at least one function of the functions that the program product described in claim (10) causes the server to realize, the user terminal being capable of communicating with the server.

(12)

A server into which the program product contained in the non-transitory computer-readable medium according to claim (10) is installed.

(13)

A method of controlling progress of a video game, the method comprising:

an experience value giving process configured to give an experience value to an object on the basis of a result of an event that occurs in accordance with progress of the video game;

a managing process configured to manage a level of the object on the basis of the given experience value; and a privilege giving process configured to give a privilege to the object on the basis of an experience value that has been given and exceeds a value required to reach an upper limit of the level (hereinafter, referred to as an "excessive experience value").

(14)

A method of controlling progress of a video game by a system, the system comprising a communication network, a server, and a user terminal, the method comprising:

an experience value giving process configured to give an experience value to an object on the basis of a result of an event that occurs in accordance with progress of the video game;

a managing process configured to manage a level of the object on the basis of the given experience value; and a privilege giving process configured to give a privilege to the object on the basis of an experience value that has been given and exceeds a value required to reach an upper limit of the level (hereinafter, referred to as an "excessive experience value").

According to one of the embodiments of the present invention, it is useful for a field of a video game.

What is claimed is:

1. A non-transitory computer-readable medium including a program product that causes at least one processor of a user terminal to execute functions to control progress of a video game, the functions comprising:

an experience value giving function configured to give an experience value to an object based on a result of an event that occurs in accordance with the progress of the video game;

a managing function configured to manage a level of the object based on the given experience value; and a privilege giving function configured to give a privilege to the object in a case where the given experience value exceeds a value required to reach an upper limit of the level, wherein the privilege giving function is further configured to give a special privilege to the object in a case where the privilege is given to the object a predetermined number of times, the special privilege is different from the privilege, and in the case where the privilege is given to the object the predetermined number of times, a single giving of the experience value to the object based on the result of the event causes both the privilege and the special privilege to be given to the object.

2. The non-transitory computer-readable medium according to claim 1, the functions further comprising:

a displaying function configured to cause a display device included in the user terminal to display a game image according to the progress of the video game on a display screen, wherein the displaying function includes:

a first function configured to cause the display device to display a first image in the game image in a case where the given experience value does not exceed the value required to reach the upper limit of the level, the first image indicating an experience value required to reach a next level; and a second function configured to cause the display device to display a second image in the game image in the case where the given experience value exceeds the value required to reach the upper limit thereof, the second image expressing that the value required to reach the upper limit of the level is reached and that the given experience value is accumulated to give the privilege, the second image having a form same as or corresponding to that of the first image.

3. The non-transitory computer-readable medium according to claim 2, wherein the first function is further configured to change a form of the first image based on a ratio between the given experience value accumulated in a current level and an experience value required to reach a next level; and the second function is further configured to change the form of the second image based on a ratio between the given experience value that has been accumulated after the value required to reach the upper limit of the level is exceeded and an experience value required to give a privilege at a next time.

4. The non-transitory computer-readable medium according to claim 3, wherein the first function is further configured to change a length of a first gauge in the first image based on the given experience value accumulated in the current level, a maximum length of the first gauge corresponding to the experience value required to reach the next level; and the second function is further configured to change a length of a second gauge in the second image based on the given experience value that has been accumulated after the value required to reach the upper limit of the level is exceeded, a maximum length of the second gauge corresponding to the experience value required to give the privilege at the next time.

5. The non-transitory computer-readable medium according to claim 2, wherein the first function is further configured to cause the display device to display the first image, which is constituted by a numerical value or a gauge, in the game image.

6. The non-transitory computer-readable medium according to claim 2, wherein the second function is further configured to cause the display device to display the second image, which is used when the value required to reach the upper limit of the level is reached, in the game image in a display mode that is same as that of the first image that is used when the given experience value does not exceed the value required to reach the upper limit of the level.

7. The non-transitory computer-readable medium according to claim 1, wherein the object includes a user and a character that is associated with the user.

8. The non-transitory computer-readable medium according to claim 1, wherein the privilege giving function is further configured to give the privilege to the object or a user that is associated with the object.

9. The non-transitory computer-readable medium according to claim 1, wherein the privilege giving function is further configured to determine whether a value of excessive experience value, that exceeds the value required to reach the upper limit of the level, satisfies a predetermined condition or not, and to give the privilege based on a determination result.

10. A non-transitory computer-readable medium including a program product for causing a server to realize at least one function of the functions that the program product described in claim 1 causes the user terminal to realize, the server being capable of communicating with the user terminal.

11. A computer into which the program product contained in the non-transitory computer-readable medium according to claim 1 is installed.

12. The non-transitory computer-readable medium according to claim 1, wherein the privilege giving function is configured to give a same privilege to the object each of the predetermined number of times.

13. A system for controlling progress of a video game, the system comprising:
   a server; and
   a user terminal connected to the server via a communication network,
   wherein at least one of the server or the user terminal is configured to give an experience value to an object based on a result of an event that occurs in accordance with the progress of the video game,
   at least one of the server or the user terminal is configured to manage a level of the object based on the given experience value,
   at least one of the server or the user terminal is configured to give a privilege to the object in a case where the given experience value exceeds a value required to reach an upper limit of the level,
   at least one of the server or the user terminal is further configured to give a special privilege to the object in a case where the privilege is given to the object a predetermined number of times,
   the special privilege is different from the privilege, and
   in the case where the privilege is given to the object the predetermined number of times, a single giving of the experience value to the object based on the result of the event causes both the privilege and the special privilege to be given to the object.

14. A non-transitory computer-readable medium including a program product that causes at least one processor of a server to execute functions to control progress of a video game, the functions comprising:
   an experience value giving function configured to give an experience value to an object based on a result of an event that occurs in accordance with the progress of the video game;
   a managing function configured to manage a level of the object based on the given experience value; and
   a privilege giving function configured to give a privilege to the object in a case where the given experience value exceeds a value required to reach an upper limit of the level,
   wherein the privilege giving function is further configured to give a special privilege to the object in a case where the privilege is given to the object a predetermined number of times,
   the special privilege is different from the privilege, and
   in the case where the privilege is given to the object the predetermined number of times, a single giving of the experience value to the object based on the result of the event causes both the privilege and the special privilege to be given to the object.

* * * * *